Jan. 10, 1956  P. T. HOULDCROFT ET AL  2,730,646
ELECTRIC ARC WELDING APPARATUS
Filed Aug. 28, 1952  3 Sheets-Sheet 1
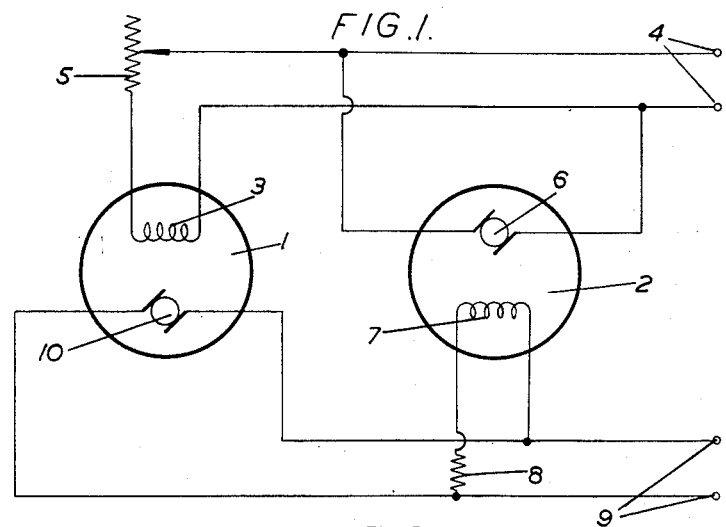
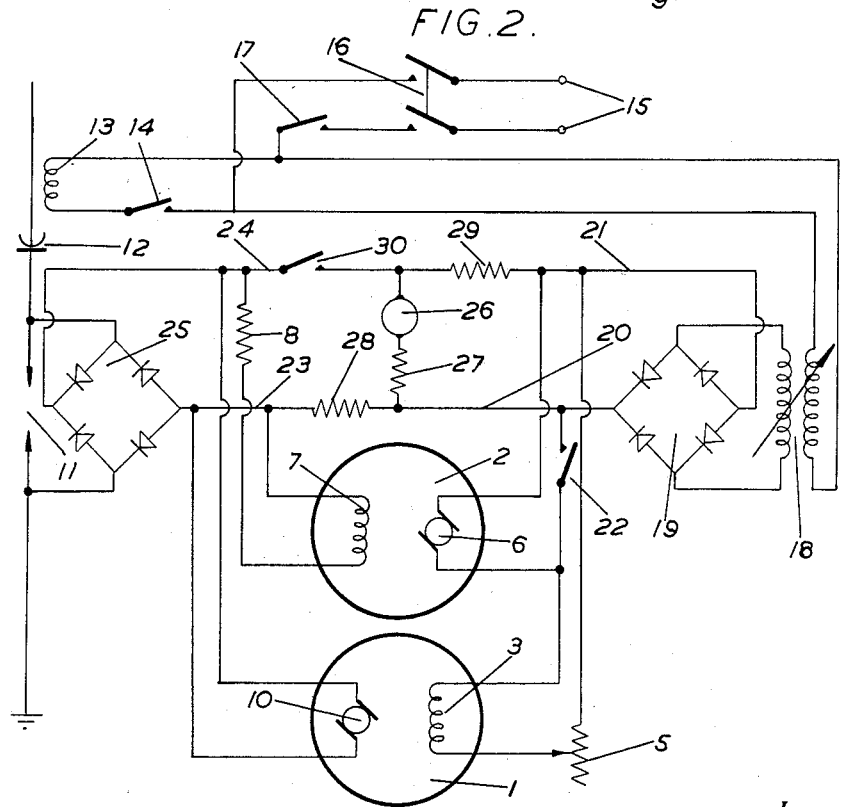
Inventors
Peter T. Houldcroft
John G. Purchas
By
Ralph B. Stewart
Attorney

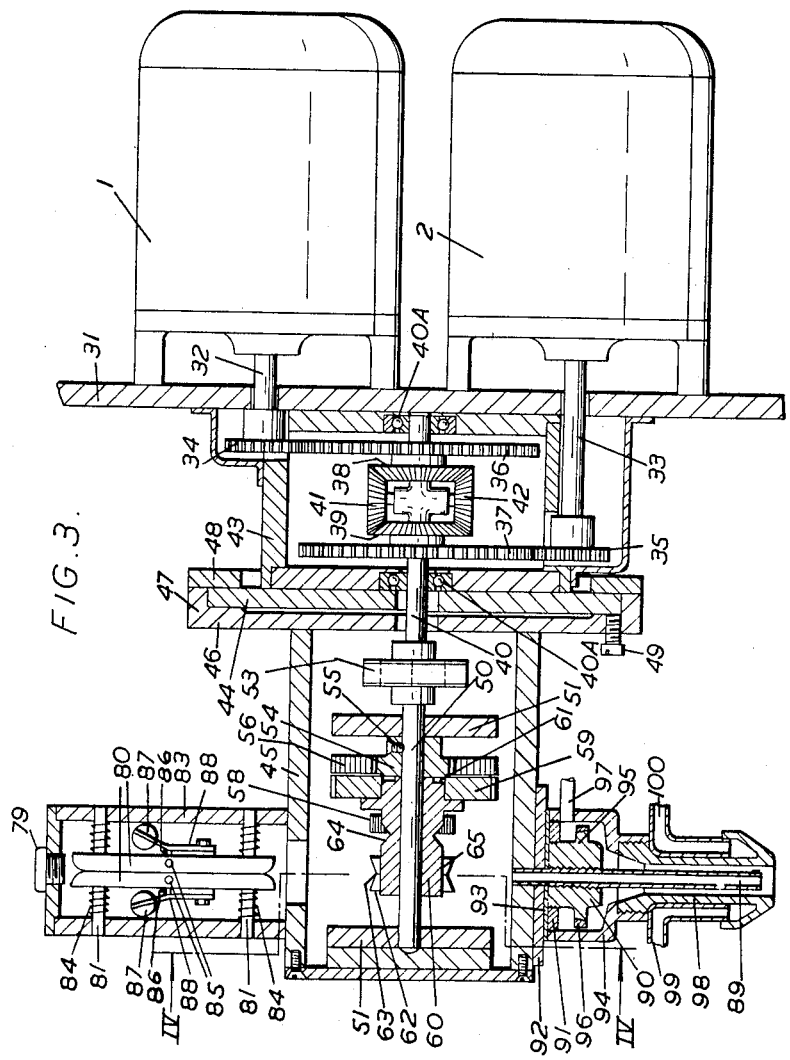

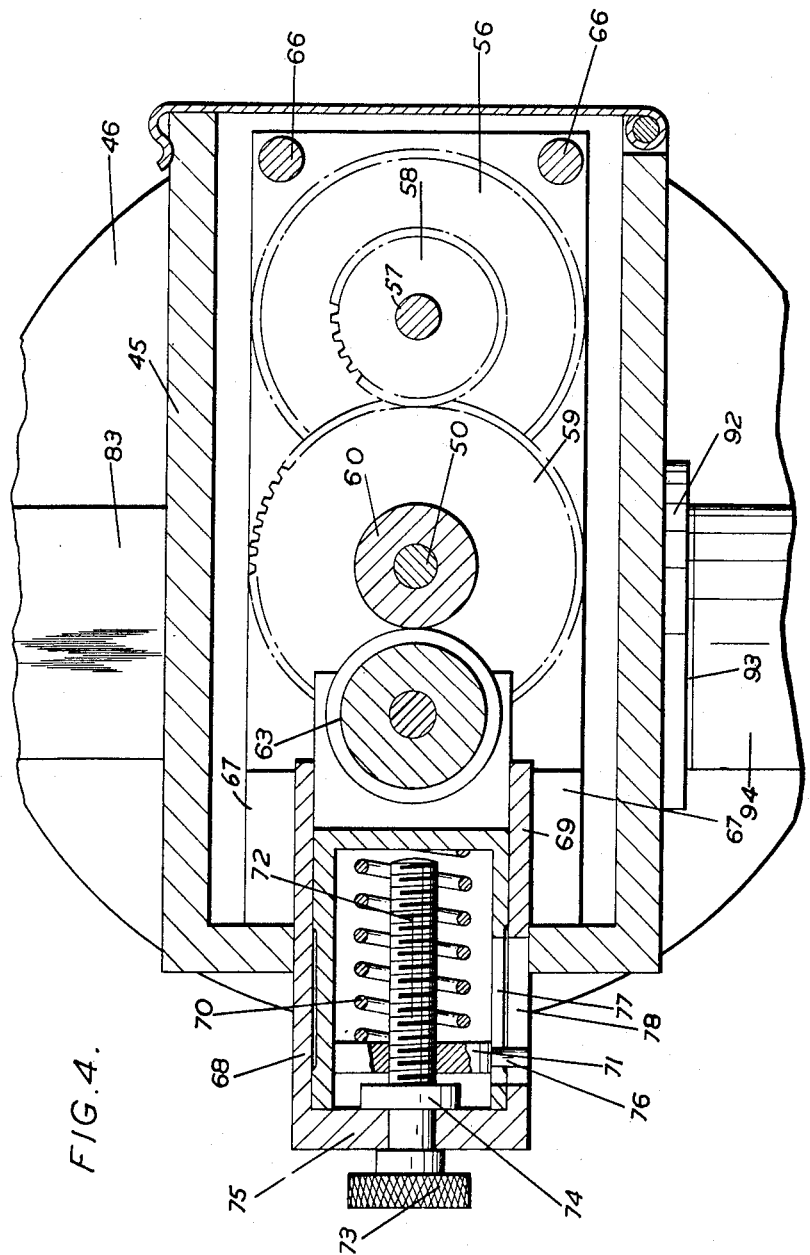

United States Patent Office 2,730,646
Patented Jan. 10, 1956

2,730,646

ELECTRIC ARC WELDING APPARATUS

Peter Thomas Houldcroft and John Guy Purchas, London, England, assignors to British Welding Research Association, London, England, a corporation of Great Britain Application August 28, 1952, Serial No. 306,814

Claims priority, application Great Britain September 3, 1951

14 Claims. (Cl. 314—62)

This invention relates to the automatic feed of a consumable electrode in electric arc welding equipment. It is applicable in any arc welding system in which metal is deposited in the weld from an electrode, which may be, for example, coated iron, or aluminium shielded by an inert gas.

To obtain uniformly satisfactory welds, it is desirable that the arc gap should be maintained at a constant length during welding and a convenient way of doing this is to control the feeding mechanism in accordance with the voltage across the arc. To avoid having to stop or reverse the whole of the feeding mechanism when the arc gap becomes too short, and restart the mechanism in the forward direction when it becomes too long, it has been arranged to feed the electrode by two electric motors which run continuously during welding and which drive the in-put member of a differential gearing in opposite directions, while the feed members are driven from the third or out-put member of the differential gear. One arrangement which has been used, is to drive one motor at a constant speed by using, for example, a synchronous alternating current motor, and to make the other motor run at a speed dependent upon the voltage drop across the arc. Thus, if the second motor runs faster than the constant speed motor, the feed members are driven in one direction to shorten the arc gap and thus reduce the voltage, whereas, if the second motor runs more slowly than the constant speed motor, the feed members are reversed and the arc gap is lengthened. When the two motors run at the same speed, the feed members are stationary. Thus, when the arc gap is of the desired length to give the correct arc voltage, the difference in speeds of the two motors drives the feed members at a speed so as to feed the electrode into the arc at the same rate at which it is being consumed.

The present invention provides a feed arrangement which is more sensitive to changes in the arc voltage and produces an increased controlling action by arranging that the feed members are driven through a differential gear as described by two motors which are connected, according to the invention, so that when the speed of one increases with the arc voltage, the speed of the other decreases and vice versa, so that the drive to the feed mechanism is a result of these two changes.

The feed members may be driven by the out-put member of a differential gear train, the in-put members of which are driven in opposite directions by shunt wound electric motors, the armature of one of which and the field winding of the other being supplied by a constant voltage source, and the field winding of the first motor and the armature of the second being supplied by a source dependent upon the arc voltage. This latter supply may be derived by direct connection across the arc, or, for instance by amplifying the voltage across the arc.

In the accompanying drawings:

Figure 1 shows a simple example of a circuit according to the invention;

Figure 2 shows an example of this circuit connected in the control circuit of an arc welding machine;

Figure 3 shows a welding head for the arrangement shown in Figure 2, in section;

Figure 4 shows a vertical section of Figure 3 on the line IV—IV of Figure 3.

In Figure 1 the motor 1 is connected to the differential gear so that an increase in speed of the motor 1 causes the rate of feed to increase, and the motor 2 is connected so that an increase in its speed decreases and may reverse the feed. The field winding 3 of the motor 1 is connected to a constant voltage direct current source at the terminals 5 through a variable resistance 5, and the armature 6 of the motor 2 is connected in parallel with the field coil 3 and resistance 5. The field coil 7 of the motor 2 is connected in series with a suitable fixed resistance 8 to a source of direct current at the terminals 9, the voltage of which is dependent upon the voltage across the welding arc, and the armature 10 of the motor 1 is connected in parallel with the field winding 7 and resistance 8.

It will be seen that with this arrangement, an increase in the arc voltage consequent upon an increasing arc gap will increase the field current of the motor 2, thus causing this to slow down, and increase the armature current of the motor 1, thus causing this to speed up, so that the rate of feed of the electrode wire is increased, thus tending to decrease the arc gap. A fall in arc voltage caused by the gap becoming too small will have the reverse effect. By adjusting the variable resistance 5, the desired mean rate of feed can be set.

Figure 2 shows the complete circuit for controlling the arc. The arc gap is shown at 11, the arc current being controlled by a contactor 12 operated by a solenoid 13. The current of the solenoid 13 is controlled by the switch 14 and is supplied from an alternating current source at the terminals 15 through a double pole main switch 16 and a switch 17 which is closed only when the cooling water is flowing through the welding head.

The constant voltage direct current supply is also drawn from this circuit through a transformer 18, the output voltage of which is variable, and which is designed so that its out-put voltage does not vary over a considerable range of loads. The out-put of the transformer is rectified by the network 19 and supplied to the conductors 20, 21 which correspond to the terminals 4 in Figure 1. A switch 22 is provided to control the current to the field coil 3 and armature 6, and is closed by the operation of the contactor 12.

The direct current arc voltage is supplied to the conductors 23, 24 corresponding to the terminals 9 in Figure 1 from the rectifier net-work 25 which is connected directly across the arc gap 11. This rectifier net-work enables the circuit to operate equally satisfactorily with either alternating or direct current welding.

To enable the difference in voltage of the arc and the direct current supply from the rectifier 19 to be indicated, a centre zero volt-meter 26 having high resistance 27 is connected as shown, the conductor 24 being the positive and 23 the negative side of the rectifier net-work 25, and the conductor 21 is the negative, and 20 the positive side of the rectifier net-work 19. Thus the volt-meter is across both voltages in opposite directions connecting two points which will be at the same potential when the out-put voltages of the rectifiers 19, 25 are equal, and an increase of the out-put of one rectifier over the other is shown by a deflection to one side or the other. To prevent these connections short-circuiting the motor circuits, equal high resistances 28, 29 are connected as shown, and a switch 30, also operated by the contactor 12, is provided between the conductor 24 and the volt-meter 26.

In operation, after the cooling water has been turned on, closing switch 17, and the main switch 16 has been closed, and while the contactor 12 and switches 22 and 30 remain open, the desired arc voltage is set by adjusting the transformer 13 and is indicated by the volt-meter 26. Upon depressing the contactor switch 14, current is supplied to the electrodes through contactor 12, and the switches 30 and 22 are closed, so that the motors 1 and 2 begin to turn, feeding the electrode to strike the arc and then, as soon as the voltage across the arc drops, drawing it away, after which the resistance 5 is adjusted until the volt-meter 26 reads zero. The feed is now set to maintain the desired arc voltage during welding.

In Figures 3 and 4, the motors 1 and 2 are rigidly mounted on a vertical plate 31. The shafts 32, 33 of the motors 1 and 2 respectively pass through the plate 31 and carry pinions 34, 35 meshing with spur wheels 36, 37 which drive the in-put members 38, 39 respectively of a differential gear. The spur wheels 36, 37 and in-put members 38, 39 are freely rotatable on a shaft 40 to which a spider 41 carrying the planetary wheels 42 of the differential gear is secured. Thus, the shaft 40 turns at a speed dependent upon the difference in speeds of the motors 1 and 2. The shaft 40 is journalled in bearings 40A mounted in the housing 43 for the differential gear which housing has a circular front plate 44 through the centre of which the shaft 40 projects. The remainder of the welding head including the feed rollers and electrode guides and nozzle are mounted on a plate 46 which has a flange 47 which fits round the circumference of the front plate 44 and is held in position by a locking ring 48 secured to the flange 47. Thus, the whole of the remainder of the welding head can be rotated on the front plate 44 about the axis of the shaft 40 and can be locked in any desired position by a set screw 49 in the plate 46 and which bears on the end plate 44. The housing 45 secured to the plate 46 contains a shaft 50 journalled in plates 51 securely mounted on and insulated from the housing 45. This shaft is arranged to lie on the same axis as the shaft 40 and is connected to it by an insulating self-aligning coupling 53. A pinion 54 is secured to the shaft 50 by a grub screw 55 and meshes with a spur wheel 56 on a lay shaft 57 (Figure 4) which also carries a pinion 58 which can be brought into mesh with a spur gear 59 on the feed roller 60 which is freely mounted on and slidable on the shaft 50. In Figure 3, these two last gears are shown not in mesh and drive is transmitted directly from the pinion 54 to the feed roller 60 through dogs 61. In this position, the electrode is gripped between the knurled cylindrical surface 62 of the feed roller 60 and the grooved spring loaded idle roller 63. This is suitable for feeding an electrode of aluminium wire. When larger electrodes, such as coated iron electrodes, have to be fed, a slower rate of feed is required and a more powerful gripping action, so that the roller 60 is slid to the left in Figure 3 until the spur gear 59 meshes with the pinion 58, dogs 61, of course, being disengaged. In this position, the grooved surface 64 of the feed roller 60 comes opposite the groove of the idle roller 63 so that the larger electrode can be gripped more securely. The arrangement is held in the high-speed position as shown in Figure 3 by inter-engagement of the side face of roller 63 and the projecting face 65 of the roller 60, and when it is desired to change to the lower speed giving a reduction of about ten to one, the roller 63 is withdrawn from engagement with the projecting face 65 of roller 60, thereby enabling the roller 60 to be moved into the position where the groove 64 comes opposite the groove in roller 63, in which position the roller 60 is retained by the presence of the electrode so that the grooves 63 and 64 automatically align themselves.

The resilient mounting for the roller 63 is shown in Figure 4. The end plates 51 of the gear box are held apart by pillars 66 and by an insulating block 67 in which block the sleeve 68 is mounted. This sleeve houses a plunger 69 which carries the roller 63 and is urged towards the roller 60 by a coiled spring 70 housed within the plunger 69 and the pressure of which can be increased by screwing up the nut 71 by means of the threaded shaft 72 provided with a hand knob 73 and collar 74 which bears against the end 75 of the sleeve 68. The nut 71 has a pin 76 which projects through corresponding slots 77, 78 in the plunger 69 and sleeve 68, so that, not only is the nut 71 prevented from rotating, but the roller 63 is held in correct orientation.

The electrode wire enters the welding head through an insulating fair lead 79 in Figure 3 and passes to the feed rollers through the split contact slides 80. These slides carry pins 81 which are slidably mounted in holes formed in the sleeve 83 of the welding head and are resiliently urged together by springs 84 on the pins 81. Movement of the slides 80 along the axis of the electrode is prevented by pins 85 which engage in slots 86 in the housing 83 but which leave the sleeve 80 free to move sideways and rock. The welding current is supplied to the slides 80 from terminals 87 which are strapped together externally and connected to the slides 89 by flexible leads 88.

The electrode wire is fed to the nozzle from the feed rollers 60, 63 through an exchangeable copper tube 89 screwed into a ferro-asbestos bush 90 mounted on a brass plate 91 secured to the lower insulating plate 92 of the gear box 45. A rubber gasket 93 is provided between the plate 92 and the plate 91 and a steel housing 94 is provided surrounding the ferro-asbestos bush 90. This bush has a flange 95 which carries a steel ring 96 which extends to within a short distance of the inner cylindrical surface of the housing 94 thus dividing the space in the housing 94 into upper and lower compartments, to the upper of which argon gas can be supplied through a tube 97. The argon gas is metered through the gap between the ring 96 and the housing 94 into the lower compartment from which it flows through the annular space between the nozzle 98 and the tube 89 to shield the arc. Cooling water is led to the nozzle 98 through the connection 99 and flows away through the connection 100.

We claim:

1. An automatic feed for a consumable arc welding electrode comprising feed members, a differential gear train comprising two in-put members and an out-put member, a driving connection between said out-put member and at least one of said feed members, two motors connected to drive said in-put members in opposite directions, means controlled by the voltage across said arc for varying the speed of one of said motors directly with changes in value of said voltage, and means controlled by said voltage for varying the speed of the second motor inversely with changes in the value of said voltage.

2. An automatic feed according to claim 1, in which the motors are similar shunt wound electric motors connected so that the field current of one motor and the armature current of the other are supplied by a constant voltage source, and the armature current of the first motor and field current of the second are dependent upon the voltage existing across the arc.

3. An automatic feed according to claim 2, in which the armature of the first motor and the field of the second motor are connected in parallel and the field of the first motor and the armature of the second are connected in parallel.

4. An automatic feed according to claim 3, in which the field of the first motor is in series with a variable resistance.

5. An automatic feed according to claim 3, in which the source of current dependent upon the arc voltage is obtained by connecting across the arc.

6. An automatic feed according to claim 5, in which the connection across the arc includes a rectifier.

7. An automatic feed according to claim 2, in which the constant voltage source is provided from a variable out-put transformer and rectifier.

8. An automatic feed according to claim 2 and including a voltage indicator, a high resistance circuit for supplying current to said indicator from said arc voltage, and a second circuit of the same high resistance value for supplying current to said indicator from said constant voltage source but in opposition to the current supplied from said arc voltage.

9. An automatic feed according to claim 1, in which the electrode is fed through a welding head which is rotatable about the axis of rotation of the differential gear out-put member, so that the electrode angle can be adjusted without altering the position of the motors or differential gear.

10. An automatic feed according to claim 1, in which the electrode is fed through a welding head which is rotatable about the axis of rotation of the differential gear out-put member, so that the electrode angle can be adjusted without altering the position of the motors or differential gear, and in which the feed mechanism comprises a feed roller driven from the out-put member, said feed roller being mounted on the same axis as the axis of rotation of the out-put member and is connected to be driven directly from said out-put member, and a spring loaded idle roller which presses the electrode against the feed roller.

11. An automatic feed according to claim 10, and including a reduction gearing driven by said output member, and means for de-coupling said feed roller from said output member and for coupling said roller to the output of said reduction gearing.

12. An automaic feed mechanism for a consumable arc welding electrode comprising an adjustable source of constant voltage, means for feeding said electrode at a rate proportional to the difference between said constant voltage and the voltage existing across the arc, means for independently varying the rate of feeding of said electrode, and means for indicating the difference between said constant voltage and said arc voltage including a voltage indicator, a high resistance circuit for supplying current to said indicator from said arc voltage, and a second circuit of the same high resistance value for supplying current to said indicator from said constant voltage source but in opposition to the current supplied from said arc voltage.

13. A feed mechanism for a consumable arc welding electrode comprising a feed member, a driving member, means coupling said feed member to said driving member, a reduction gearing driven by said driving member, and means for de-coupling said feed member from said driving member and for coupling said feed member to the output of said reduction gearing.

14. A feed mechanism according to claim 13 wherein said de-coupling and coupling means comprises a gear slidable along the axis of said feed member between two positions and rotatable therewith, said gear engaging said reduction gearing in one of said positions and engaging said driving member in the other of said positions.

References Cited in the file of this patent

UNITED STATES PATENTS

| | | |
|---|---|---|
| 1,374,404 | Soons et al. | Apr. 12, 1921 |
| 2,079,956 | Burgett | May 11, 1937 |
| 2,443,658 | Kratz | June 22, 1948 |

FOREIGN PATENTS

| | | |
|---|---|---|
| 412,892 | Great Britain | July 5, 1934 |